Figure 1:
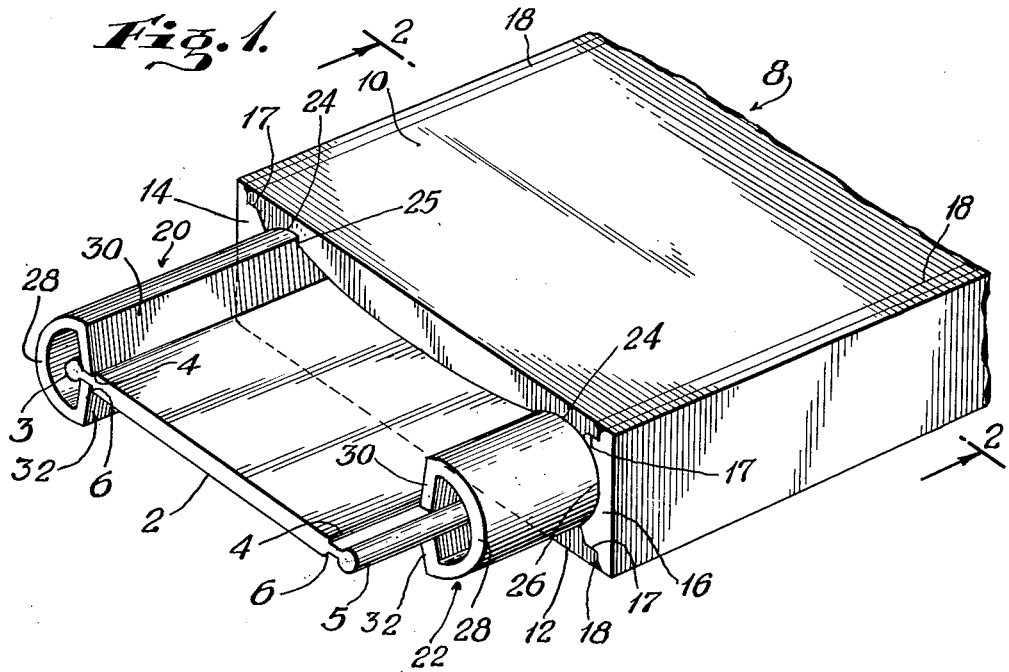

Nov. 14, 1961   R. P. LAPSLEY ET AL   3,009,008
AIR-DIELECTRIC CABLE
Filed June 6, 1960

INVENTORS
RHEA P. LAPSLEY
ROBERT G. FELLER
BY James G. Bethell
ATTORNEY

United States Patent Office 3,009,008
Patented Nov. 14, 1961

3,009,008
AIR-DIELECTRIC CABLE
Rhea P. Lapsley, Ridgewood, and Robert G. Feller, Wayne, N.J., assignors to The Okonite Company, Passaic, N.J., a corporation of Delaware
Filed June 6, 1960, Ser. No. 34,276
8 Claims. (Cl. 174—28)

This invention relates to an improvement in air-dielectric cables, such as are used, for example, for the transmission of signals or electric energy at high frequencies.

In conventional designs of such cables a round central conductor, usually of copper, is supported concentrically within and in spaced relation to a metallic sheath, usually of solid aluminum or copper, which functions as the return conductor.

Various forms of supports have been used for supporting the central conductor in spaced relation to the metallic sheath. For example, in some designs a multiplicity of insulating discs have been spaced at intervals along the central conductor to hold the central conductor concentrically spaced within the sheath, while in other designs various forms of filaments are spiraled around the central conductor.

There is considerable energy loss in the various insulations used for supporting the central conductor; therefore, the total volume of insulating supports contained within the dielectric field and the area of contact of the dielectric supports with the central conductor is kept as small as possible so as to reduce this energy loss within the insulation to a minimum. The area of contact of the supports with the outer conductor, however, is not so critical, as current density and voltage stress are less at the inner surface of the outer conductor than at the outer surface of the inner conductor.

Relatively large amounts of energy are also dissipated within the central conductor. This is due primarily to its relatively small circumference, as compared to the outer conductor or sheath, so that there is relatively high current density and high voltage stress at the skin surface of the central conductor.

These energy losses increase attenuation and decrease the efficiency of the conductor.

One objective of this invention is to provide an air-dielectric, high-frequency cable of such construction that the energy losses within the dielectric supports are much lower than in conventional designs.

The invention also provides an air-dielectric, high-frequency cable of such construction that energy losses are low in the central conductor within the frequency range for which the cable is designed.

The improved cable of this invention has low attenuation and high transmission efficiency.

This invention also provides an air-dielectric, high-frequency cable in which the outer sheath is made in sections, each section extending longitudinally of the cable for the full length of the cable, and the sheath, the central or inner conductor, and the dielectric supports may be reeled and shipped separately and assembled in the field, so that cables of large current-carrying capacity may be transported in longer continuous lengths than has been practicable heretofore.

In high-frequency cables of the two-conductor concentric design the current travels on the outer surface of the inner conductor and on the inner surface of the outer conductor. It is also known that the depth of penetration of the current into the conductor surface varies with frequency and conductor material, but it is very small—in the order of 5 mils to .5 mil or the like, for example—at high frequencies, depending upon conductor material and frequency, so that having a conductor wall much thicker than that is wasteful, except for mechanical reasons.

Where high power is to be carried or where it is desired to reduce the losses per unit length of line, it has been found necessary with conventional designs to go to larger-diameter central conductors, which necessitates that the cable be of very large outside diameter to maintain the desired characteristic impedance. Cables of conventional design larger than three inches in outside diameter are most difficult to transport in long lengths, as reels of excessive drum diameter are required to prevent damage to the outer conductor or sheath when the cable is reeled.

It should be noted also that in conventional designs of high-frequency cables current density and voltage stress become very high at the surface of the central conductor, inasmuch as the circumference of this conductor is relatively small, and the conductor is carrying the entire current on its surface, and, inasmuch as the supports for the central conductor contact the conductor at its surface, considerable energy is dissipated into the dielectric supports in exciting the molecules of the supports where they contact the conductor. The amount of energy thus dissipated is related to current density and voltage stress, for it is known that insulation contacting the outer conductor or sheath, where current density and voltage stress are lower than at the surface of the central conductor, does not absorb nearly so much energy.

Where a circular central conductor is enclosed concentrically within a circular sheath and is supported in this position by longitudinal supports of dielectric material or by one or more helical supports of dielectric material, the current shifts to a non-uniform condition, concentrating most densely under the supports and less densely in the conductor surfaces between supports. This movement of current within the conductors or increase of concentration of current under the supports causes higher losses in the cable.

The present invention provides means for forcing the current to flow more evenly over the conductor surfaces between supports, with minimum current flowing in the areas of the conductors under the supports or at least avoiding concentration of current under these supports, thereby to reduce losses in the conductors and in the dielectric, so that it is possible to make non-circular, high-frequency cables of very large current-transmission capacity which are still small enough to be wound on their minor axes upon a reel with a drum diameter of a practicable size, so that long lengths of cable can be easily transported by rail, ship, or truck. The separate components of the cable may also be shipped separately, if desired, and assembled in the field.

Figure 2:
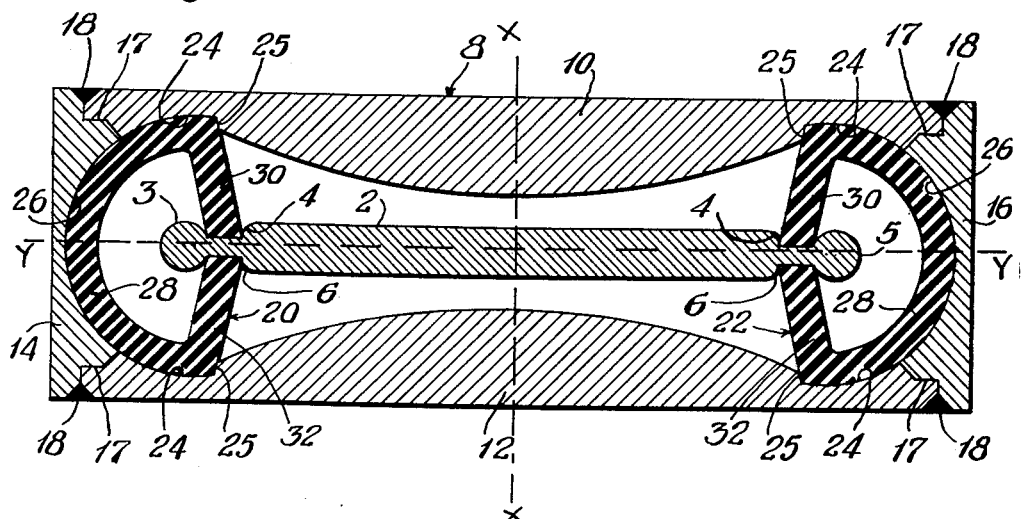

In the accompanying drawing, showing an embodiment of the invention,

FIG. 1 is a perspective view of an air-dielectric cable embodying the present invention; and FIG. 2 is a section taken along the line 2—2 of FIG. 1.

Referring to the drawing in detail, 2 designates the central conductor. This conductor is a continuous, reelable, flat metal strip, of copper for example. One flat face of this central conductor is provided with a pair of depressions 4 and the opposite flat face with a pair of depressions 6. As will be seen from the drawing, these depressions are positioned near the two shaped longitudinal edges 3 and 5 of the conductor 2. Each depression extends continuously the full length of the conductor.

The outer conductor or sheath 8 is composed of four reelable sections—top and bottom body sections 10 and 12, and side or edge sections 14 and 16. Each of these four sections, which may be of aluminum for example, is continuous in length and extends longitudinally of the cable for the entire length of the cable. The four sections of the outer conductor extend parallel to each other in interfitting, abutting relation, with each side or edge section intermediate the top and bottom body sections. The abutting edges 17 of the sections are welded to each other, as shown at 18.

The central conductor 2 is supported centrally within the outer conductor or sheath 8 by reelable dielectric supports 20 and 22. These supports, which are more or less tubular in form, are of a suitable material, such as polyethylene or styrene for example, and each support extends continuously lengthwise of the cable for the entire length of the cable.

As shown at 24, the inner face of each of the top and bottom body sections 10 and 12 of the outer conductor 8 is concaved adjacent the side edges of each section. The entire inner face of each of the side or edge sections 14 and 16 is concaved, as shown at 26. The depressions 24 and 26 merge into each other, and each depression extends continuously lengthwise of the cable for the entire length of the cable.

As will be seen from the drawing, when the cable components are assembled, the portion 28 of the wall of each of the dielectric supports 20 and 22 lies in the concaved portions 24 and 26 of the outer-conductor body sections and side sections, with the dielectric supports abutting the shoulders 25 of the body sections 10 and 12 provided by the concave depressions 24 in the sections.

The remainder of the wall of each of the dielectric supports 20 and 22 is split medially longitudinally for the entire length of the support to receive the inner conductor. The portion 30 of each split wall extends inwardly from the outer-conductor body section 10 into the corresponding depression 4 in the upper flat face of the inner conductor 2. The other portion 32 of each split wall of the supports extends inwardly from the outer-conductor body section 12 into the corresponding depression 6 in the lower flat face of the inner conductor. It will be appreciated that this provides a construction whereby throughout the entire length of the cable the dielectric supports make firm contact with the outer conductor and the inner conductor is supported centrally within the outer conductor in spaced relation thereto.

It is important for best operation that the spacing between the inner conductor 2 and the outer conductor 8 be identical in the four quadrants of the cable as defined by the major and minor transverse axes $x$—$x$ and $y$—$y$, respectively of the cable. The close-fitting, abutting edges 17 of sheath sections 10, 12, 14, and 16 are so shaped that, when pressed into abutting relation and welded as at 18, the desired alignment and compression will be applied through portions 30 and 32 of the dielectric supports 20 and 22 to hold the conductor 2 centrally within the sheath 8.

Although assembled finished cables constructed in accordance with this invention may, because of their small minor axis, be reeled and shipped in what presently is considered large sizes and long lengths, it will be appreciated that, because the cable is composed of several components, each capable of being reeled and shipped separately and field-assembled, it becomes possible to ship larger sizes and longer lengths than heretofore considered practicable.

In the operation of the cable herein disclosed, the current tends to travel on the outer skin of the inner or central conductor 2 and return on the inner skin of the outer conductor 8. These, of course, are the portions of the two current-carrying parts that are in closest proximity to each other. Depth of penetration into the skin of the two conductors is an inverse function of inductance, which depends upon distance of the two currents from each other as well as upon current frequency and conductor material. The relatively shallow indentations or depressions, such as provided in the faces of the inner conductor 2 at 4 and 6, increase the distance between the two conductors at the indentations and, therefore, at high frequency change the inductive reactance and capacitive reactance at these points and forestall high-frequency currents from running down into the indentations. Thus, by having the dielectric supports 20 and 22 extend into these depressions, the supports contact the central conductor at points of minimum current density, so that the electrical losses in the supports will be substantially reduced.

To compensate for the tendency of the current at high frequency to be denser at the surface of the inner conductor 2 near the longitudinal edges 3 and 5 and less dense on the surface of the inner conductor 2 at the area between the depressions 4 and 6, and to spread the current more evenly on the surface of the conductor 2 between depressions, the outer conductor 8 is bowed inwardly toward the inner conductor 2, so that the distance between conductors along the minor central axis $x$—$x$ of the cable is considerably less than at each side of this axis. It will be understood that, alternatively, the inner conductor may be bowed outwardly, or both conductors may be bowed toward each other.

It will be seen from the foregoing that the dielectric supports 20 and 22 and the conductors 2 and 8 are so shaped and arranged that the minimum spacing of the two conductors at the areas of contact of each support with the inner and outer conductors exceeds the spacing of the conductors at all areas between the supports.

It will be appreciated also that the high-frequency, air-dielectric cable herein disclosed is so constructed that current flow is widely distributed over surfaces touching only air, so that the cable has a very low order of losses, low attenuation, and high transmission efficiency.

It will be seen also that in this cable current density is nil or eliminated at areas of insulating supports, so that losses occurring in the supports are eliminated to a major extent.

It is to be understood that changes may be made in the details of construction and arrangement of parts hereinabove described within the purview of this invention.

What is claimed is:

1. A high-frequency, air-dielectric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body and side sections abutting; means for rigidly and continuously securing the sections to each other along their said abutting edges; and a pair of tubular dielectric supports within the outer conductor extending continuously the length thereof, one portion of the wall of each of said tubular supports contacting the inner face of a side section of the outer conductor as well as the adjacent portions of the two body sections of the outer conductor, the remainder of the support wall being split longitudinally, medially, for the entire length of the support for the reception of the inner conductor, said split portion of the support contacting opposed faces of the inner conductor, whereby the inner conductor is supported centrally within the outer conductor in spaced relation thereto, the minimum spacing of the two conductors at the areas of contact of each support with the inner conductor and with the body sections of the outer conductor exceeding the spacing of the two conductors between supports.

2. A high-frequency, air-dielectric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body sections and side sections abutting with an interfit; means for rigidly and continuously securing the sections to each other along their said abutting edges; and a pair of tubular dielectric supports within the outer conductor extending continuously the length thereof, one portion of the wall of each of said tubular supports contacting the inner face of a side section of the outer conductor as well as the adjacent portions of the two body sections of the outer conductor, the remainder of the support wall being split longitudinally, medially, for the entire length of the support for the reception of the inner conductor, which is contacted on its opposed faces by the split portion of the support, thereby to support the inner conductor centrally within the outer conductor in spaced relation thereto, the minimum spacing of the two conductors at the areas of contact of each support with the inner conductor and with the body sections of the outer conductor exceeding the spacing of the two conductors between supports.

3. A high-frequency, air dielectric cable comprising, in combination, an outer, hollow conductor and a flat inner conductor within said outer conductor, said outer conductor comprising a pair of elongated, reelable body sections and a pair of elongated, reelable side sections, said sections extending parallel to each other lengthwise of the cable throughout the length of the cable, each side section being disposed intermediate a pair of body sections with the adjacent edges of adjacent body and side sections welded to each other; and a pair of reelable, tubular dielectric supports extending the length of the cable along the inner face of each of said side sections of the outer conductor, one portion of the wall of each of said supports contacting the inner face of a side section of the outer conductor as well as the adjacent portions of the two body sections of the outer conductor, the remainder of the support wall being split longitudinally, medially, for the reception of the inner conductor, which is contacted on its opposed faces by the split portion of the support wall, thereby to support the inner conductor centrally within the outer conductor in spaced relation thereto, the minimum spacing of the two conductors at the areas of contact of each support with the inner conductor and with the body sections of the outer conductor exceeding the spacing of the two conductors at all areas between supports.

4. A high-frequency, air-dielectric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body and side sections abutting, and means for rigidly and continuously securing the sections to each other along their said edges; said inner conductor being flat and extending the length of the outer conductor and having continuous grooves in its flat faces adjacent each edge of the conductor; and a pair of tubular dielectric supports within the outer conductor extending continuously the length thereof, one portion of the wall of each of said supports contacting the inner face of a side section of the outer conductor as well as the adjacent portions of the two body sections of the outer conductor, the remainder of the support wall being split longitudinally, medially, for the entire length of the support for the reception of the inner conductor, the split wall of the support contacting the opposed faces of the inner conductor at the grooves therein, thereby supporting the inner conductor centrally within the outer conductor in spaced relation thereto, the minimum spacing of the two conductors at the areas of contact of each support with the inner conductor and with the body sections of the outer conductor exceeding the spacing of the two conductors between supports.

5. A high-frequency, air-dielectric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body and side sections abutting; means for rigidly and continuously securing the sections to each other along their said abutting edges; and a pair of tubular dielectric supports within the outer conductor extending continuously the length thereof, one portion of the wall of each of said tubular supports being conformed to and contacting the inner face of a side section of the outer conductor as well as the adjacent portion of the two body sections of the outer conductor throughout the entire length of the outer conductor, the remainder of the support wall being split longitudinally, medially, for the entire length of the support for the reception of the inner conductor, said split portion of the support wall contacting opposed faces of the inner conductor, whereby the inner conductor is supported centrally within the outer conductor in spaced relation thereto, the minimum spacing of the two conductors at the areas of contact of each support with the inner conductor and with the body sections of the outer conductor exceeding the spacing of the two conductors between supports.

6. A high-frequency, air-dielectric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body and side sections abutting; means for rigidly and continuously securing the sections to each other along their said abutting edges; and a pair of tubular dielectric supports within the outer conductor extending continuously the length thereof, one portion of the wall of each of said tubular supports making continuous contact with the inner face of a side section of the outer conductor for the full length of the outer conductor, the remainder of the support wall being split longitudinally, medially, for the entire length of the support for the reception of the inner conductor, said split portion of the support wall contacting opposed faces of the inner conductor, whereby the inner conductor is supported centrally within the outer conductor in spaced relation thereto, the minimum spacing of the two conductors at the areas of contact of each support with the inner conductor and with the body sections of the outer conductor exceeding the spacing of the two conductors between supports.

7. A high-frequency, air-dieleitric cable comprising, in combination, an outer, hollow conductor and an inner conductor within said outer conductor, said outer conductor comprising a pair of elongated body sections and a pair of elongated side sections, said sections extending parallel to each other lengthwise of the cable throughout the length of the cable and disposed with each side section intermediate a pair of body sections and with the adjacent edges of adjacent body and side sections abutting; means for rigidly and continuously securing the sections to each other along their said abutting edges; and a pair of tubular dielectric supports within the outer conductor extending continuously the length thereof, one portion of the wall of each of said tubular supports contacting the inner face of a side section of the outer conductor as well as the adjacent portions of the two body sections of the outer conductor, the remainder of the support wall being split longitudinally, medially, for the entire length of the support for the reception of the inner conductor, said split portion of the support contacting opposed faces of the inner conductor, whereby the inner conductor is supported centrally within the outer conductor in spaced relation thereto, the inner conductor and the body sections of the outer conductor being so shaped that the distance between conductors in the area midway of the space between supports is substantially less than at each side of this area, and the minimum spacing of the two conductors at the areas of contact of each support with the inner conductor and with the body sections of the outer conductor exceeding the spacing of the two conductors between supports.

8. A high-frequency, air-dielectric cable comprising, in combination, an outer, hollow conductor and an inner conductor within said outer conductor, said outer conductor comprising an elongated cavity bounded on its major transverse axis by concave conducting walls and on its minor transverse axis by convex conducting walls, said inner conductor comprising an elongated conducting member with a major transverse axis and minor transverse axis of smaller dimension than the major and minor transverse axes of the cavity; and dielectric means to support said inner conductor within said outer conductor in spaced relation thereto, the spacing between the inner conductor and the outer conductor being identical in the four quadrants of the cable as defined by the major and minor transverse axes of the cable, said spacing being minimum along the minor transverse axis.

No references cited.